US012579378B2

(12) United States Patent
Gupta et al.

(10) Patent No.: US 12,579,378 B2
(45) Date of Patent: Mar. 17, 2026

(54) USING LLM FUNCTIONS TO EVALUATE AND COMPARE LARGE TEXT OUTPUTS OF LLMS

(71) Applicant: Databricks, Inc., San Francisco, CA (US)

(72) Inventors: Ridhima Gupta, Bellevue, WA (US); Prithvi Kannan, San Francisco, CA (US); Sunish Sohil Sheth, San Jose, CA (US); Kasey Uhlenhuth, San Francisco, CA (US); Hubert Zub, Bialystok (PL); Corey Zumar, Santa Clara, CA (US)

(73) Assignee: Databricks, Inc., San Francisco, CA (US)

( * ) Notice: Subject to any disclaimer, the term of this patent is extended or adjusted under 35 U.S.C. 154(b) by 230 days.

(21) Appl. No.: 18/518,155

(22) Filed: Nov. 22, 2023

(65) Prior Publication Data

US 2025/0124236 A1      Apr. 17, 2025

(30) Foreign Application Priority Data

Oct. 16, 2023    (PL) ......................................... 446396

(51) Int. Cl.
G06F 40/40 (2020.01)
G06F 40/103 (2020.01)
G06F 40/30 (2020.01)

(52) U.S. Cl.
CPC ............ G06F 40/40 (2020.01); G06F 40/103 (2020.01); G06F 40/30 (2020.01)

(58) Field of Classification Search
CPC ......... G06F 40/40; G06F 40/103; G06F 40/30
See application file for complete search history.

(56) References Cited

U.S. PATENT DOCUMENTS

| | | | | |
|---|---|---|---|---|
| 2018/0151081 A1* | 5/2018 | Chen | ....................... | G09B 5/02 |
| 2020/0057762 A1* | 2/2020 | Okajima | ................ | G06N 5/022 |
| 2023/0370396 A1* | 11/2023 | Ban | ......................... | H04L 51/18 |
| 2024/0303421 A1* | 9/2024 | Fabian | .................. | G06F 40/284 |
| 2024/0378394 A1* | 11/2024 | Kotikalapudi | .......... | G06F 40/40 |
| 2025/0094816 A1* | 3/2025 | Hu | .......................... | H04L 51/02 |

OTHER PUBLICATIONS

Yan T, Xu T. Refining the Responses of LLMs by Themselves. arXiv preprint arXiv:2305.04039. May 6, 2023. (Year: 2023).*

* cited by examiner

*Primary Examiner* — Daniel C Washburn
*Assistant Examiner* — Paul J. Mueller
(74) *Attorney, Agent, or Firm* — Fenwick & West LLP

(57) ABSTRACT

A method for evaluating textual output of one or more machine-learned language models is presented. The method includes receiving, from a user of a client device, a first prompt for input to one or more machine-learned language models, providing the first prompt to the one or more models for execution, and receiving a set of generated responses to the first prompt from the one or more models. The method further includes generating a user interface (UI) on the client device displaying the first prompt and generated responses as a table user interface element. The method applies a selected evaluation function to the generated response to evaluate the response with respect to an evaluation objective and identifies words that influence the evaluation. The method generates one or more UI elements on the UI to display the results of the evaluation for the generated responses.

17 Claims, 8 Drawing Sheets

Figure 6:
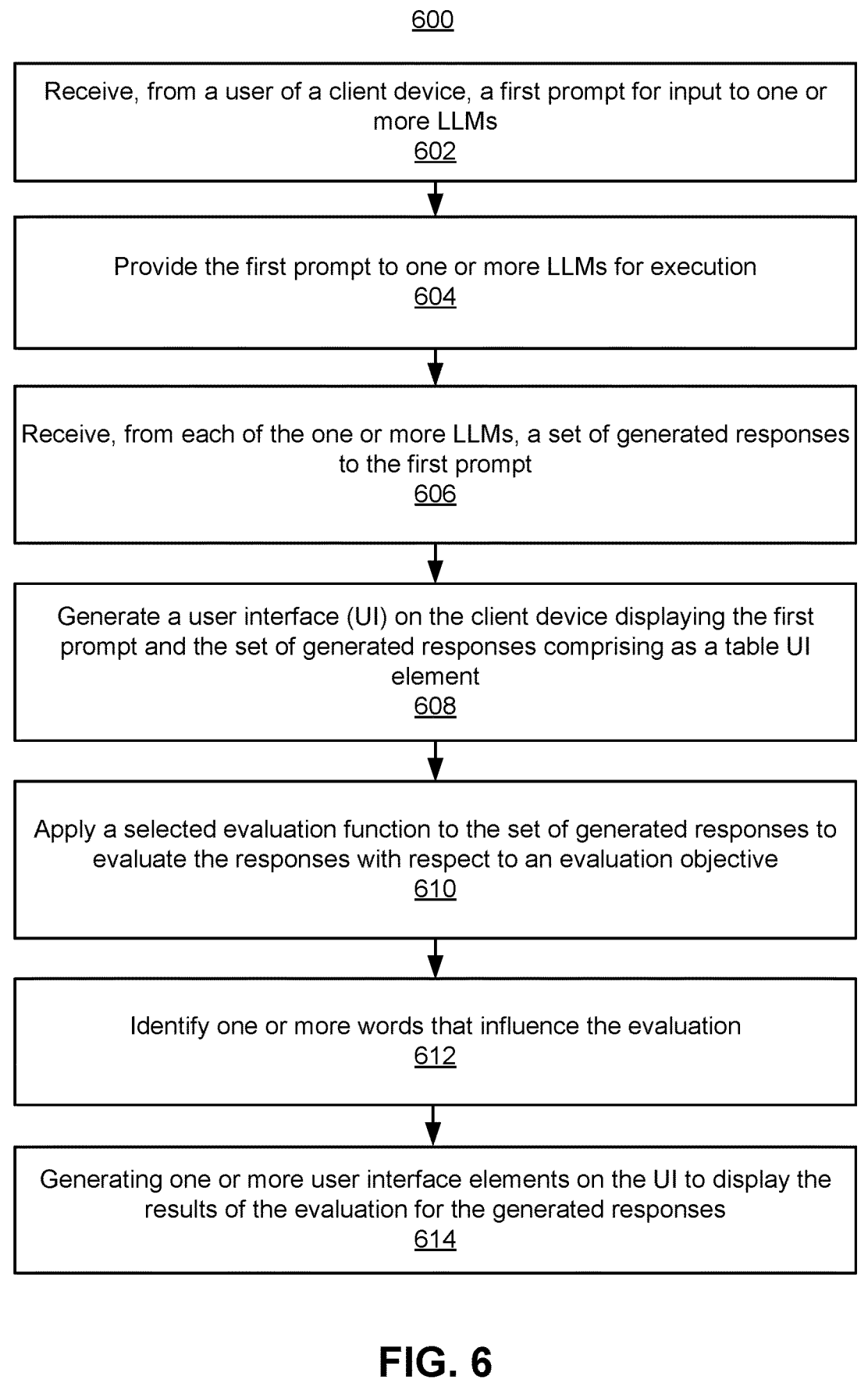

600

Receive, from a user of a client device, a first prompt for input to one or more LLMs
602

↓

Provide the first prompt to one or more LLMs for execution
604

↓

Receive, from each of the one or more LLMs, a set of generated responses to the first prompt
606

↓

Generate a user interface (UI) on the client device displaying the first prompt and the set of generated responses comprising as a table UI element
608

↓

Apply a selected evaluation function to the set of generated responses to evaluate the responses with respect to an evaluation objective
610

↓

Identify one or more words that influence the evaluation
612

↓

Generating one or more user interface elements on the UI to display the results of the evaluation for the generated responses
614

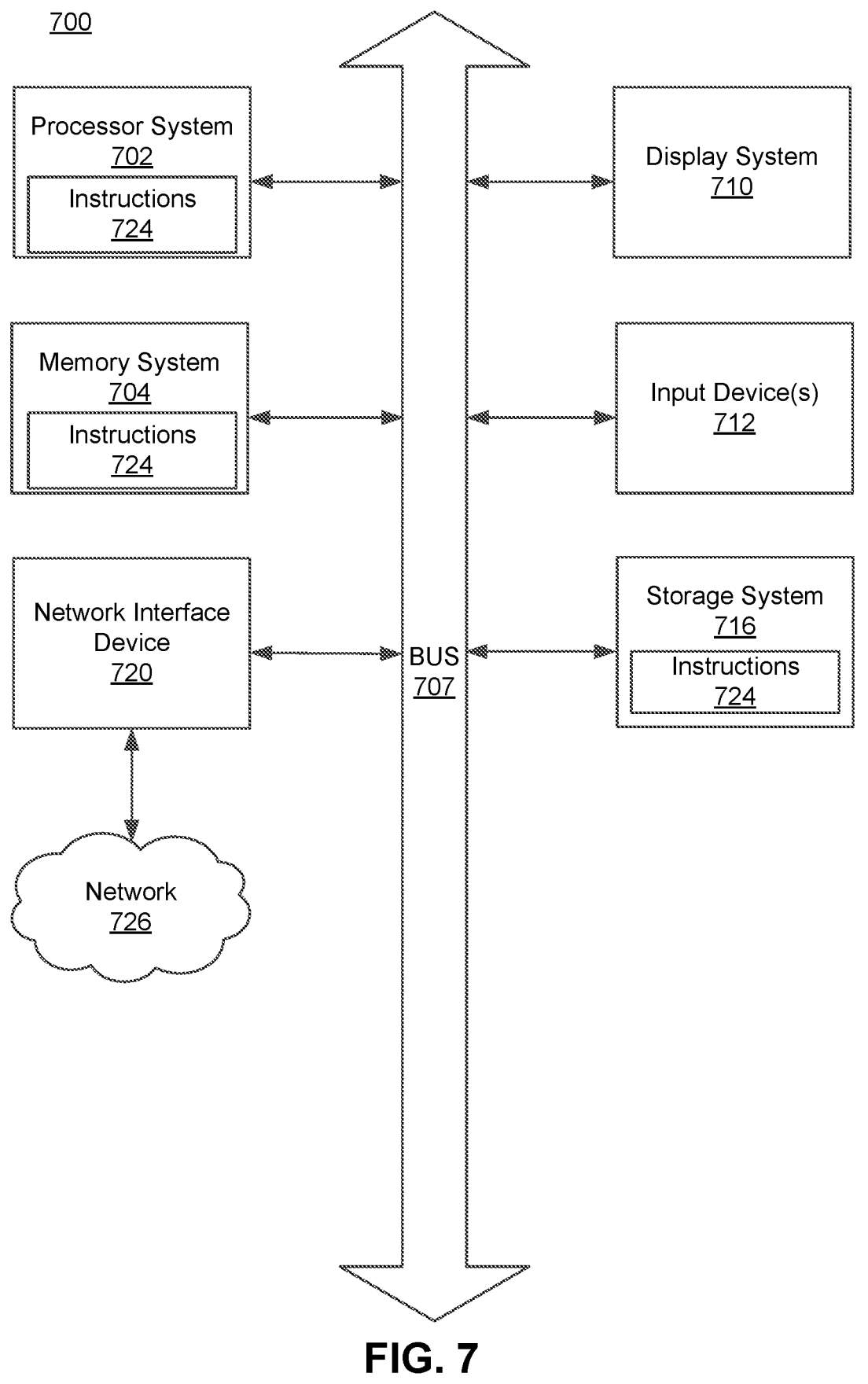

Processor System
702

Instructions
724

Display System
710

Memory System
704

Instructions
724

Input Device(s)
712

Network Interface
Device
720

BUS
707

Storage System
716

Instructions
724

Network
726

FIG. 7

USING LLM FUNCTIONS TO EVALUATE AND COMPARE LARGE TEXT OUTPUTS OF LLMS

CROSS REFERENCE TO RELATED APPLICATIONS

This application claims priority to prior, co-pending Polish Application No. 446396, filed on Oct. 16, 2023, which is incorporated herein by reference in its entirety for all purposes.

RELATED FIELD

This disclosure relates generally to Large-Language Model (LLM) functions, and more specifically to, using LLM functions to evaluate large textual output of various LLMs on different tasks.

BACKGROUND

In recent years, Large-Language Model (LLM) development has become a common research endeavor and has seen significant advancements. LLMs have been integrated into numerous real-world applications, such as chatbots and recommendation systems. Unlike traditional machine learning (ML) models which generate outputs that can be evaluated using clear objective metrics like accuracy or F1 scores, LLMs can generate large amounts of text, which necessitates more complex evaluation methods.

SUMMARY

Embodiments of the present disclosure relates to a method for evaluating textual output of one or more LLMs. The method includes a data processing service, data storage system, and client devices communicatively coupled over a network. The data processing service may include a control layer and a data layer. The control layer may be configured to receive and process requests from the client devices and manage resources in the data layer. The control layer includes a machine learning model which may be configured to receive prompts from users of client devices, obtain responses to the prompts, apply an evaluation function to the responses, and display the responses through an interface module. The machine learning module may include an inference module, an evaluation module, and a user interface (UI) element generator module. The inference module is configured to provide the user prompts to the LLMs to perform inference and receive a set of generated responses to the first prompt. The evaluation module is configured to receive the set of generated responses from the inference module and apply a selected evaluation function to each of the responses. The evaluation module may identify one or more words that influence the evaluation. The UI element generator module is configured to generate a UI element over the identified words. For example, the UI element highlights the identified words. This allows for the evaluation of the output of an LLM and allows the user to easily view and compare the evaluation results of one or more LLMs.

BRIEF DESCRIPTION OF THE DRAWINGS

FIG. 6 is a flowchart illustrating a process for evaluating one or more LLMs and generating a UI to display the results of the evaluation, in accordance with an embodiment.

FIG. 7 is a block diagram illustrating an example machine to read and execute computer readable instructions, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (computer-readable medium or method) for purposes of illustration only. One skilled in the art will readily recognize from the following description that alternative embodiments of the structures and methods illustrated herein may be employed without departing from the principles described herein.

Overview

Figure 1:
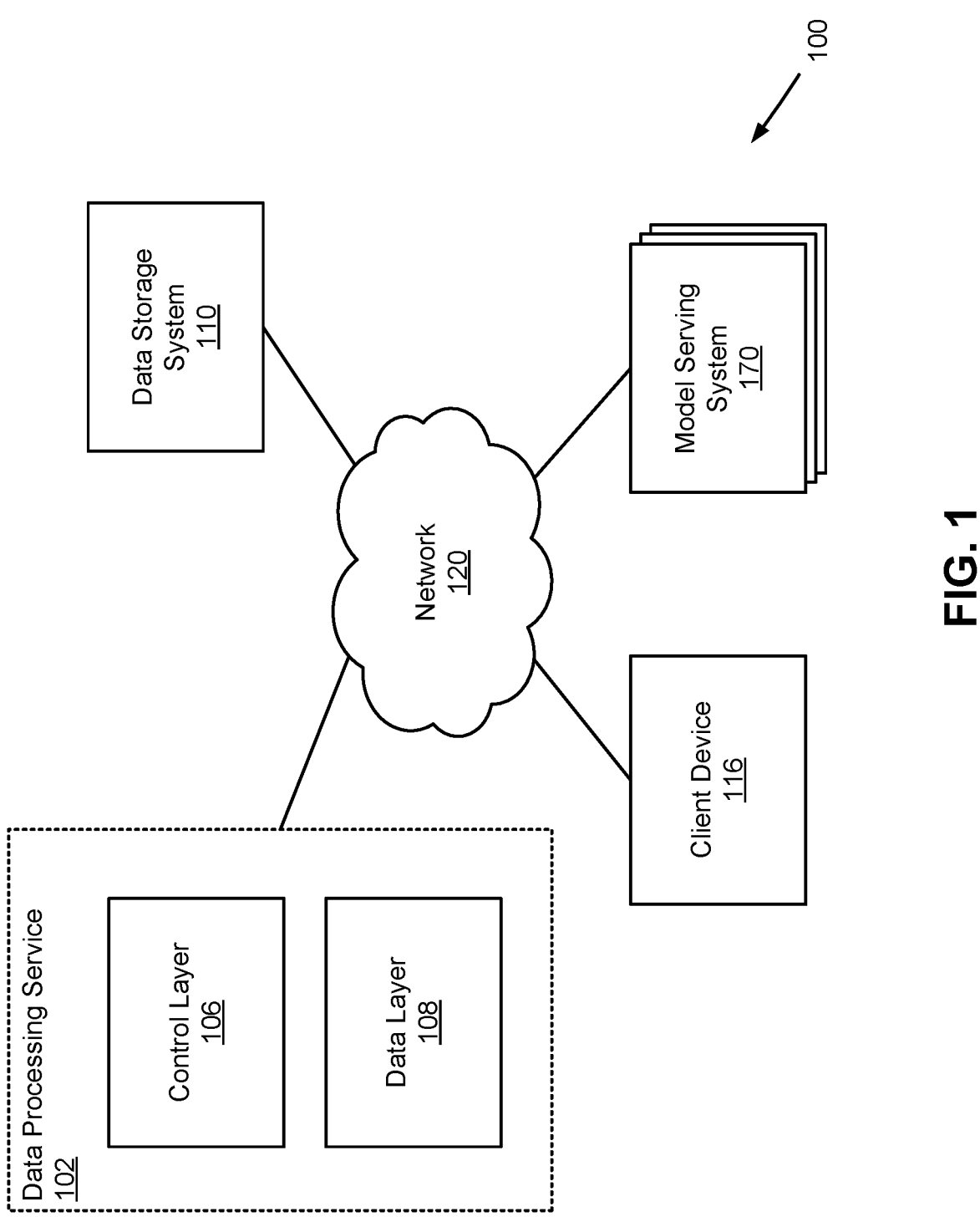
FIG. 1 is a high-level block diagram of a system environment for a data processing service, in accordance with an embodiment.

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116A, 116B (collective referred to as 116). The data processing service 102 may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning (ML) and artificial intelligence (AI) requests, and the like, on data stored by the data storage system 110. For example, an ML or AI request may be a prompt for execution by one or more machine-learned models. The data processing service 102 may provide responses to the requests to the users of the client devices 116 after they have been processed.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. In one instance, the clusters of computing resources are virtual machines or virtual data centers configured on a cloud infrastructure platform. In one instance, the control layer 106 is configured as a multi-tenant system and the data layers 108 of different tenants are isolated from each other. In one instance, a serverless implementation of the data layer 108 may be configured as a multi-tenant system with strong virtual machine (VM) level tenant isolation between the different tenants of the data processing service 102. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

In one embodiment, the components of the data processing service 102 allows a user of the data processing service 102 to evaluate outputs from different LLM's or other large-scale machine-learning models and provides a UI that allows the user to analyze the results of the evaluation across the different models. Specifically, for certain machine learning models that are trained with a "gold standard" label, it is feasible to compare performance across different models because the evaluation of the performance is a numerical metric (e.g., whether the outputs are close to the gold standard labels for the data instances or not), via validation methods such as cross-validation. In contrast, generative large-scale machine learning models synthesize and generate data as output in the form of text, images, and audio. Thus, different models synthesize and generate data differently with respect to style, syntax, content, and different users also value outputs of these models according to different criteria. For example, one user may prefer to deploy a LLM with the least amount of hallucination, while another user may prefer to deploy a LLM with the least amount of toxicity irrespective of whether there is hallucination or not. It is a technically difficult problem to evaluate generative outputs across different generative models. As described in more detail below, the data processing service 102 provides a system in which users can define certain evaluation functions of interest and evaluate the outputs from one or more generative models with respect to this evaluation function.

The model serving system 170 deploys one or more machine-learning models. In one instance, the machine-learning models are large language models (LLMs) that are trained on a large corpus of training data to generate outputs for tasks. An LLM may be trained on massive amounts of text data, often involving billions of words or text units. The large amount of training data from various data sources allows the LLM to generate outputs for many different types of tasks. An LLM may have a significant number of parameters in a deep neural network (e.g., transformer architecture), for example, at least 1 billion, at least 15 billion, at least 135 billion, at least 175 billion, at least 500 billion, at least 1 trillion, or at least 1.5 trillion parameters.

Since an LLM has significant parameter size and the amount of computational power for inference or training the LLM is high, the LLM may be trained and deployed or hosted on cloud infrastructure. An LLM may be trained on a large amount of data from various data sources, including websites, articles, posts on the web, and the like. From this massive amount of data coupled with the computing power of LLM's, the LLM is able to perform various tasks and synthesize responses based on information extracted from the training data. In one embodiment, the model serving system 170 is managed or may be part of the data processing service 102. In another embodiment, the model serving system 170 may be managed by another entity, and there may be different instances of the model serving system 170 deploying a respective model deployed by a respective entity.

In one embodiment, the model serving system 170 receives a request in the form of a prompt and generates a response to the prompt. The prompt or response may include text, images, audio, and the like and may be multi-modal. In one embodiment, the machine-learning model is configured as a transformer neural network architecture. Specifically, the transformer model is coupled to receive sequential data tokenized into a sequence of input tokens and generates a sequence of output tokens depending on the task to be performed when the model is an LLM. For example, the transformer may have a generative pre-training (GPT) architecture or may have an encoder-decoder architecture that include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, bi-directional encoder representation transformer (BERT), generative-adversarial networks (GAN), or diffusion models (e.g., Diffusion-LM).

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or a data management system may be managed by the same entity that manages the data processing service 102.

For example, when the data storage system 110 is managed by the entity managing the data processing service 102, the data storage system 110A may reside within the data layer 108. The data storage system 110A may include dedicated cloud storage for respective tenants of the data processing service 102. In another instance, the data storage system 110B may be external and/or remote to the data processing service 102 in that a different entity manages the data of the data storage system 110B. For example, the data storage system 110B may be located in a remote location from the data processing service 102.

The client devices 116 are computing devices that display information to users and communicate user actions to the systems of the system environment 100. While two client devices 116A, 116B are illustrated in FIG. 1, in practice many client devices 116 may communicate with the systems of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™. In the system environment 100, only one client device 116 are shown for the sake of simplicity. However, it is appreciated that the system environment 100 may include many more client devices 116 connected to the network 120.

Figure 2:
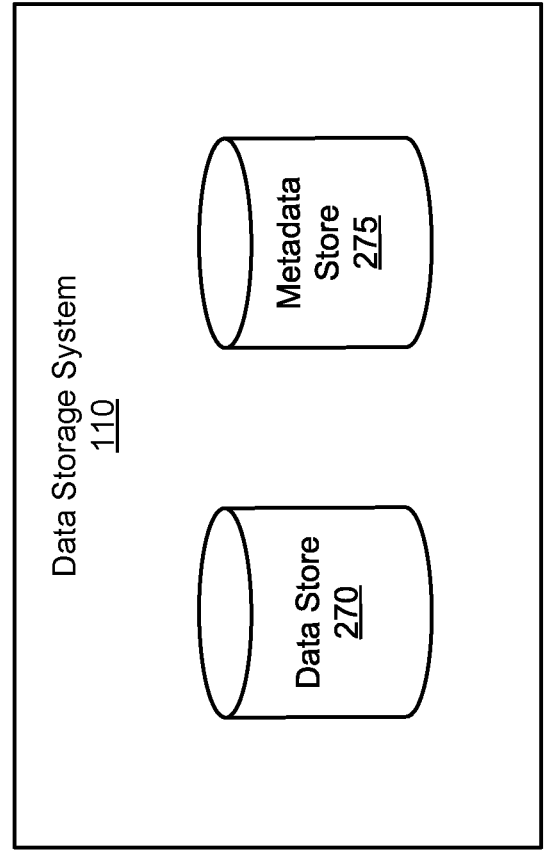
FIG. 2 illustrates a block diagram of an architecture of a data storage system, in accordance with an embodiment.

FIG. 2 is a block diagram of an architecture of a data storage system 110, in accordance with an embodiment. The data storage system 110 includes a data store 270 and a metadata store 275. In one embodiment, the data storage system 110 includes a data ingestion module (not pictured).

The data store 270 stores data associated with different tenants of the data processing service 102. In one embodiment, the data in data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110A.

In one embodiment, a new version of the data table is committed when changes of a respective transaction are successfully applied to the data table of the data storage system 110A. Since a transaction may remove, modify, or add data files to the data table, a particular version of the data table in the transaction log may be defined with respect to the set of data files for the data table. For example, a first transaction may have created a first version of a data table defined by data files A and B each having information for a respective subset of records. A second transaction may have then created a second version of the data table defined by data files A, B and in addition, new data file C that include another respective subset of records (e.g., new records) of the data table.

In one embodiment, the transaction log may record each version of the table, the data files associated with a respective version of the data table, information pertaining to the type of transactions that were performed on the data table, the order in which the transactions were performed (e.g., transaction sequence number, a timestamp of the transaction), and an indication of data files that were subject to the transaction, and the like. In some embodiments, the transaction log may include change data for a transaction that also records the changes for data written into a data table with respect to the previous version of the data table. The change data may be at a relatively high level of granularity, and may indicate the specific changes to individual records with an indication of whether the record was inserted, deleted, or updated due to the corresponding transaction.

In some embodiments, the data storage system 110 stores data used for machine learning applications implemented by the control layer. The data storage system 110 may include a machine learning (ML) model server (not pictured) which stores ML models, versions of each of the ML models, and sets of parameters for the trained ML models. The ML model server may also store training data and testing data for training and testing the ML models. The ML model server may also store inputs and generated outputs of the ML models. In an embodiment, the ML models are developed by users of the data processing service 102, and training and testing data are provided (e.g., uploaded) by the users.

Figure 3:
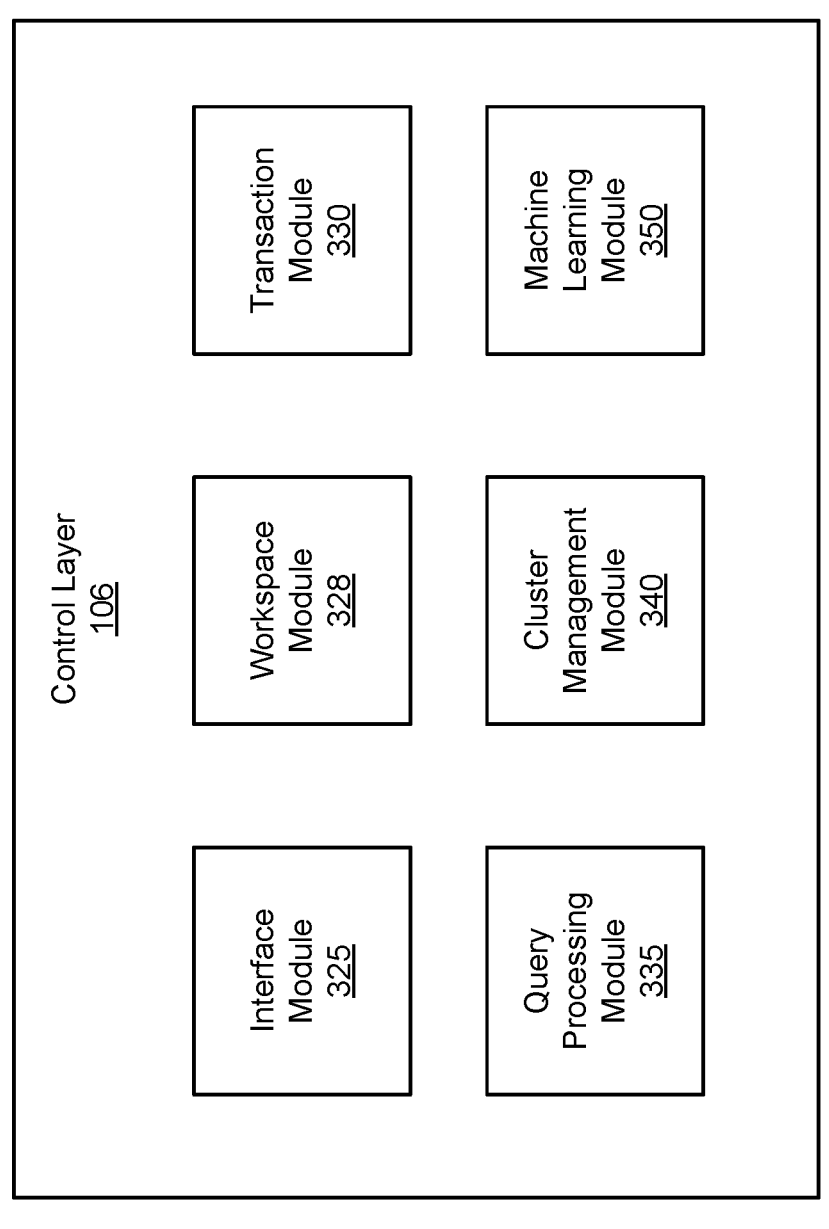
FIG. 3 illustrates a block diagram of an architecture of a control layer, in accordance with an embodiment.

FIG. 3 is a block diagram of an architecture of a control layer 106, in accordance with an embodiment. In one embodiment, the data processing service 102 includes an interface module 325, a transaction module 330, a query processing module 335, a cluster management module 340, and a machine learning module 350. The control layer 106 also includes a data notebook store 360.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user. In one embodiment, a user may access the workspace via a user interface (UI), a command line interface (CLI), or through an application programming interface (API) provided by the workspace module.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

In an embodiment, the interface module 325 receives a request to perform an evaluation on outputs from one or more machine learning models, specifically LLM's. The interface module 325 may receive results of the evaluation from the machine learning module 350 that include the prompts to these models, the outputs for each prompt, and present the results of evaluating the outputs using the evaluation function in a UI. A prompt may include the task request of the user and additional context information provided by the user. The interface module generates a UI that includes responses received from the machine learning module 350 in response to the one or more prompts.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 335 receives and processes queries that access data stored by the data storage system 110. The query processing module 335 may reside in the control layer 106. The queries processed by the query processing module 335 are referred to herein as database queries. The database queries are specified using a declarative database query language such as the SQL. The query processing module 335 compiles a database query specified using the declarative database query language to generate executable code that is executed. In one embodiment, the query processing module 335 provides one or more queries to appropriate clusters of the data layer 108, and receives responses to the queries from clusters in which the queries are executed.

The machine learning module 350 receives ML requests from a user of a client device 116 and performs corresponding ML tasks. In one embodiment, as described in conjunction with FIG. 1, the machine learning module 350 is responsible for evaluating outputs for one or more LLM's and presenting the evaluation to the user. The machine learning module 350 receives the ML requests from the user through the interface module 325. The ML requests may include inference tasks using machine-learned models deployed by the data processing service 102 or another third-party service. The inference tasks may include, but are not limited to, natural language processing (NLP) tasks, audio processing tasks, image processing tasks, video processing tasks, and the like. The NLP tasks may include, but are not limited to, text generation, query processing, machine translation, chatbot applications, and the like. The machine learning module 350 performs evaluation tasks including applying an evaluation function to an output of a machine-learned model to determine the performance of the machine-learned model with respect to the evaluation function. The machine learning module 350 generates an evaluation result and provides it to the interface module 325, which generates a UI for display to the user.

Figure 4:
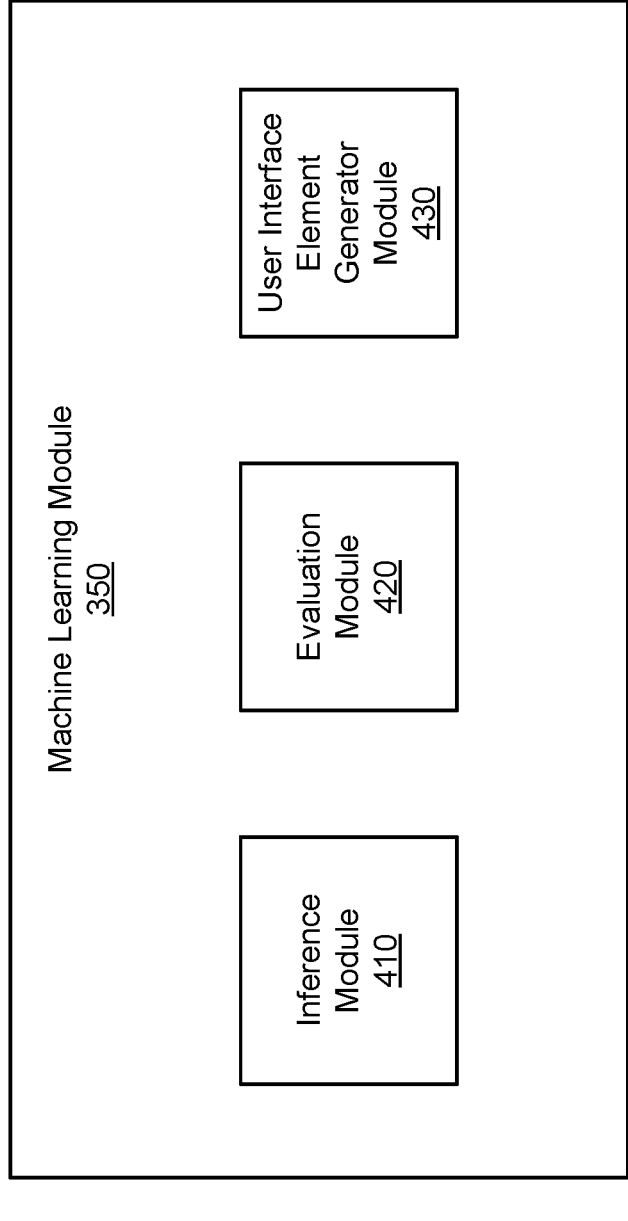
FIG. 4 illustrates a block diagram of an example machine learning module, in accordance with an embodiment.

FIG. 4 illustrates a block diagram of an example machine learning module 350, in accordance with an embodiment. The machine learning module 350 may include an inference module 410, an evaluation module 420, and a user interface (UI) element generator module 430.

The user may select, through the UI provided by the interface module 325, one or more LLMs to be evaluated. The inference module 410 receives a prompt from a user of a client device 116 and provides the prompt to the one or more selected LLMs deployed in the model serving system(s) 170 to perform inference. The LLMs generate the response to the prompt from the knowledge that the LLM was trained on and/or from the contextual information included in the prompt. The inference module 410 receives the generated responses from the one or more LLMs of the model serving system(s) 170 and provides the generated responses to the UI element generator module 430 and the evaluation module 420.

The evaluation module 420 receives the set of generated responses from the inference module 410 and evaluates the set of generated responses with respect to an evaluation objective. In one instance, the evaluation module 420 implements an evaluation LLM which applies a selected evaluation function to each of the generated responses. The evaluation LLM may be configured to have any appropriate architecture including, but not limited to, a transformer-based architecture, long short-term memory (LSTM) networks, Markov networks, BART, generative-adversarial networks (GAN), diffusion models (e.g., Diffusion-LM), and the like. The evaluation LLM is configured to receive a prompt and generate a response to the prompt.

The prompt may include a request to apply a selected evaluation function, the set of generated responses from the one or more LLMs, and other additional contextual information such as examples of input and desired output to guide the evaluation LLM in constructing answers. The response generated by the evaluation LLM may include an identification of one or more words in a generated response which influence the evaluations. Some examples of evaluation functions include, and are not limited to, keyword similarity, toxicity detection, and hallucination detection. Some evaluation functions require a ground truth (e.g., expected output) to generate an evaluation result. The user of the client device may provide an expected output corresponding to each input prompt to the one or more LLMs.

For the keyword similarity evaluation function, the evaluator LLM identifies similar or matching keywords between the expected output and the generated responses from the one or more LLMs. The evaluator LLM extracts keywords from the expected output—the expected output may be user provided. In another embodiment, the evaluator LLM extracts keywords from the expected output and each of the generated responses. In another embodiment, a Named Entity Recognition (NER) algorithm is used to extract keywords form the expected output.

In some embodiments, the evaluation module 420 constructs a contextual prompt which provides contextual information to the evaluation LLM, which guides the evaluation LLM in generating evaluation results. For example, the contextual prompt provided to the evaluation LLM to extract keywords from the expected output may be:

"Given a text passage, please identify the keywords present in the text and their corresponding positions. Keywords are the specific words or phrases that carry significant meaning, represent the main ideas, or are essential for understanding the context of the text. Below are some examples:

Sentence: "The company is experiencing significant growth in its international markets."

Keywords: company, experiencing, significant growth, international markets.

Sentence: "The recipe calls for flour, sugar, eggs, and butter."

Keywords: recipe, flour, sugar, eggs, butter.

Sentence: "The smartphone features a high-resolution camera and a long-lasting battery."

Keywords: smartphone, high-resolution camera, long-lasting battery.

Sentence: "The new policy aims to promote sustainability and reduce carbon emissions."

Keywords: new policy, promote sustainability, carbon emissions.

Your task is to analyze the given passage and extract the keywords that stand out and contribute to the overall meaning of the text. Please list the identified keywords along with their positions in the text."

The evaluation module 420 identifies one or more words that influence the evaluation. For example, for the keyword similarity evaluation function, the evaluator LLM identifies the extracted keywords from the expected output and in each of the generated responses. The evaluator LLM may use vector similarity to determine the similarity between the extracted keywords from the expected output and the identified keywords from the generated responses. Vector similarity techniques may include, but are not limited to, cosine similarity, Euclidean distance, Jaccard similarity, and Pearson correlation coefficient. In some embodiments, the evaluation LLM calculates a similarity score for each generated response based on the number of similar or matching keywords between the expected output and the generated responses. The evaluator LLM returns characterizing data of each of the identified keywords. In some embodiments, the characterizing data may include the position of each of the identified keywords in the text of each of the generated responses.

For toxicity detection, the evaluator LLM identifies potentially harmful or offensive language in the generated responses from the one or more LLMs. The evaluator LLM may calculate a toxicity score for each of the generated responses. A predetermined toxicity threshold can be used to determine if a generated response is toxic or non-toxic. For example, a response having a toxicity score less than the toxicity threshold may be considered non-toxic. In an embodiment, the evaluator LLM classifies the responses as toxic or non-toxic. For toxic responses, the evaluator LLM determines characterizing data (e.g., position) of the toxic words.

For hallucination detection, the evaluator LLM identifies portions of the generated responses that do not originate from the input prompt or provided contextual information. Hallucinations may also include factual inaccuracies and improbable scenarios. The evaluator LLM uses contextual information provided to the LLM to identify hallucinated portions of the generated responses. In another embodiment, the evaluator LLM compares the generated responses to an expected output. The evaluator LLM may calculate a hallucination score for each of the generated responses. For responses determined to contain hallucinated portions, the evaluator LLM determines characterizing data (e.g., position) of the hallucinated words. The evaluation module 420 provides the results of the evaluation and characterizing data to the UI element generator module 430.

The UI element generator module 430 generates UI elements over the words identified by the evaluation functions to display the results of the evaluation of the generated responses to the user. The UI element generator module 430 receives the characterizing data (e.g., position) of each of the identified words in the generated responses from the one or more LLMs and generates a UI element on the UI which highlights the identified words. This is described in further detail in FIG. 5A.

Figure 5A:
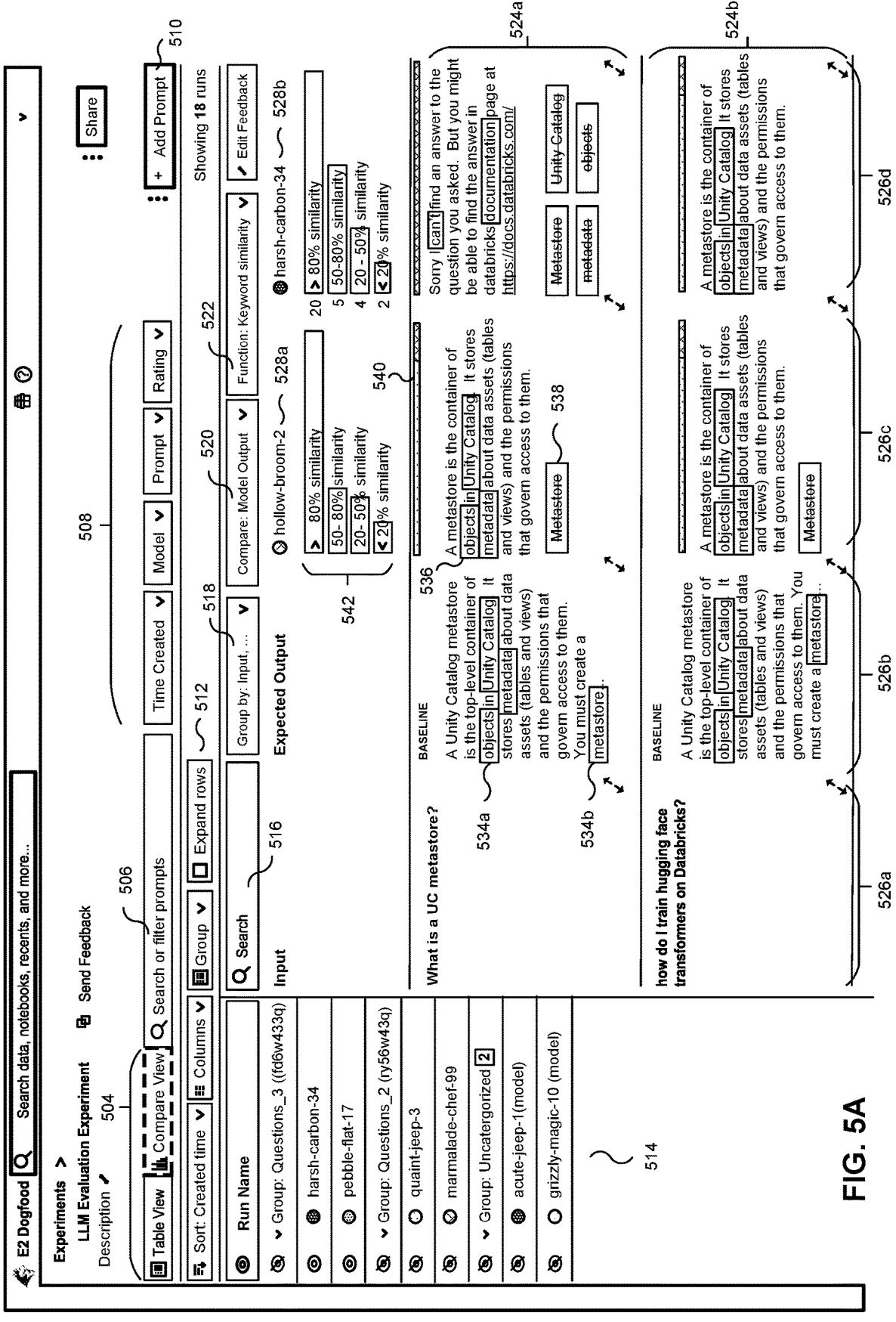
FIG. 5A illustrates an example user interface (UI) layout displayed to the user of a client device, in accordance with an embodiment.

FIG. 5A illustrates an example user interface (UI) layout displayed to the user of a client device, in accordance with an embodiment. The UI displays an example "LLM Evaluation" experiment created by the user of a client device. Using the UI, a user can view the contents of the experiment, including the input prompts to the selected LLMs, the generated responses from each of the selected LLMs corresponding to each of the input prompts, and the evaluation results for the generated responses. In an embodiment, the contents of the experiment are displayed in a table UI. The user can customize the contents that are displayed in the table UI using the control buttons positioned around the UI. For example, the user can choose to view the contents of the experiment in a table view or a compare view using the view buttons 504 located at the top left of the UI. The table view may display the generated responses for one model. For the illustrated example, the contents of the experiment are displayed according to the compare view, which allows the user to view the generated responses for more than one model at a time.

The user can also search or filter prompts using particular search terms entered into the search bar 506, located adjacent to the view buttons 504. The user can use the dropdown buttons 508 located adjacent to the search bar 506 to filter the results based on time created, model, prompt, and/or rating.

The user can further customize the display of the UI using the row of buttons 512 located under the view buttons 504. The row of control buttons 512 includes a dropdown sort button to sort the prompts based on certain properties. For example, the prompts may be sorted based on created time, model, and/or rating. The row of control buttons 512 also includes dropdown filter buttons which allow the user to select the columns and groups to display on the UI. The row of control buttons 512 also includes a checkbox button which expands the rows of the table UI to allow full view of the contents of the cells of the table UI.

The UI includes a column 514 which displays recorded runs of the LLMs. The table UI located to the right of the column 514 displays the contents of the experiment. The user may search the contents of the table UI element using the search bar 516. The user can also further customize the UI by using control dropdown buttons 518, 520, 522. The control dropdown button 518 allows users to group results by particular properties, such as input. The control button 520 allows users to compare data across the different LLMs, such as model output. The control buttons 522 allows users to select an evaluation function to apply to the generated responses from the LLMs.

In FIG. 5A, two input prompts, the expected output (baseline output) to the input prompts, and the corresponding responses from two LLMs are shown. The input prompts are displayed in the left most column 526a, and each input prompt displayed in a row 524a, 524b. The expected outputs are displayed in the column 526b adjacent to column 526a. The generated responses from a first LLM 528a (hollow-broom-2) to the input prompts are displayed in column 526c, while the generated responses from a second LLM 528b (harsh-carbon-34) are displayed in column 526d. As shown in row 524a, an example prompt from the user to the one or more LLMs may be:

What is a UC Metastore?

The UI element generator module 430 receives, from the one or more LLMs, a set of generated responses to the first prompt. An example generated response from one of the LLMs may be shown in row 524a column 526c:
"A metastore is the container of objects in Unity Catalog. It stores metadata about data assets (tables and views) and the permissions that govern access to them."

The UI element generator module 430 generates a table UI on the client device 116 displaying the first prompt and the set of generated responses comprising as a table UI element. Each input prompt is presented in a row, while the generated responses from each LLM corresponding to the input prompts are presented in columns. In some embodiments, the expected outputs corresponding to the input prompts presented in a column.

The UI element generator module 430 receives the results of the selected evaluation function to the set of generated responses. As described in FIG. 4, the evaluation module 420 implements an evaluation LLM which applies a selected evaluation function to each of the generated responses. Some examples of evaluation functions include, and are not limited to, keyword similarity, toxicity detection, and hallucination detection. The UI element generator module 430 generates one or more user interface elements on the UI to display the results of the evaluation for the generated responses. The UI element generator module 430 receives the characterizing data (e.g., position) of each of the identified words in the generated responses from the one or more LLMs and generates a UI element on the UI which highlights the identified words.

For example, for the keyword similarity evaluation function, the UI element generator module 430 receives the position of keywords found in the expected output and the position of keywords found in each of the generated responses of the LLMs. The UI element generator module 430 generates one or more UI elements which highlight the identified keywords. For example, keywords found in both the expected output and the generated response are highlighted green to indicate a match. In embodiments where one or more keywords present in the expected output are not present in the generated response, the UI element generator module 430 generates a UI element that highlights the missing keyword red.

In another example, for toxicity detection, the UI element generator module 430 may generate a UI element that highlights the toxic word red. For hallucination detection, the UI element generator module 430 may generate a UI element that highlights the hallucinated portions red.

In the illustrated example, the keyword similarity evaluation function is applied the generated responses from the LLMs. The UI element generator module 430 generates one or more UI elements over identified keywords in the expected output and the generated responses from the LLMs. Referring to the first prompt in column 526a row 524a, the keywords extracted from the expected output in column 526b row 524a, are "objects", "Unity Catalog", "metadata", and "metastore". The machine learning module 350 generates, for example, UI elements 534a, 534b to highlight each of the keywords. The machine learning module 350 identifies these keywords in the generated responses from the first and second LLM 528a, 528b. Referring to the generated response from the first LLM 528a in column 526c row 524a, the keywords "objects", "Unity Catalog", and "metadata" are identified, while "metastore" was not found. The machine learning module 350 generates UI elements 536 to highlight each of the identified keywords green and generates UI element 538 which contains "metastore" that is struck out and highlighted red. This indicates that the keyword was not found in the response.

The UI also includes a bar UI element 540 above each generated response that indicates the overall keyword similarity between the expected output and the generated response of the LLM. The bar UI element 540 may include a green shaded portion (represented by dot pattern) to represent a visual estimate of the number of similar keywords, and a red shaded portion (represented by checkered pattern) to represent a visual estimate of the number of missing keywords.

In addition, the UI includes a bar chart UI element 542 positioned at the top of each column associated with an LLM. The bar chart UI element 542 shows a visual summary of the evaluation result. For example, referring to the bar chart UI element 542 of the first LLM 528a, the bar at the bottom represents a visual representation of the number of responses that have a similarity score of less than 20%, while the bars above represent a visual representation of the number of responses that have a similarity score of 20%-50%, 50% to 80%, and greater than 80%. A numerical quantity is positioned to the right of each bar, the numerical quantity representing the number of responses that belong to the range of similarity score associated to the bar. For example, out of 31 generated responses, 20 responses have a similarity score of greater than 80%.

Figure 5B:
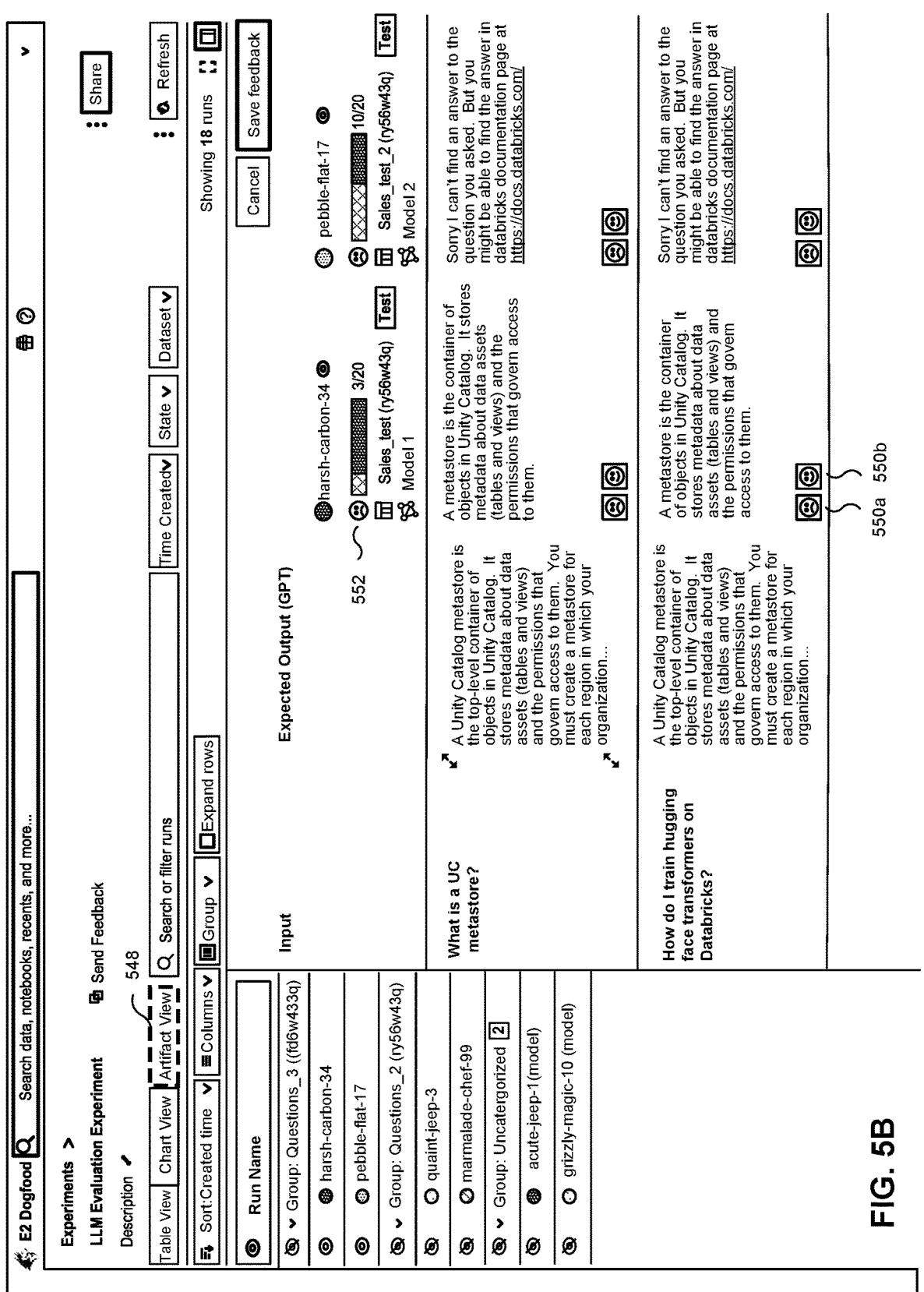
FIG. 5B illustrates an example UI layout displayed to the user of a client device, in accordance with an embodiment.

FIG. 5B illustrates a UI layout displayed to the user of a client device, in accordance with an embodiment. The UI shown in FIG. 5B is substantially similar to the UI displayed by FIG. 5A. The UI includes control buttons to enable a chart view and an artifact view 548. For the illustrated example, the contents of the experiment are displayed according to the artifact view, which allows the user to view the user feedback assigned to the generated responses from one or more LLM. The UI includes a feedback mechanism 550a, 550b which allows users to indicate the quality of the generated response. In the illustrated example, the feedback mechanism includes a smiling face (e.g., positive feedback) and a frowning face (e.g., negative feedback) button positioned at the bottom of the table cell. The UI element generator module 430 tallies the user feedback and generates a visual representation of the feedback using the bar UI element 552. The bar UI element 552 includes a red shaded portion (represented by checkered pattern) to represent a visual estimate of the number of negative user feedback.

The UI may have alternative configurations than shown in FIG. 5A or FIG. 5B, including for example, different, fewer, or additional buttons.

FIG. 6 is a flowchart illustrating a process for evaluating one or more LLMs and generating a UI to display the results of the evaluation, in accordance with an embodiment. The user selects the one or more LLMs to be evaluated. The machine learning module receives 602, from a user of a client device, a first prompt for input to the one or more LLMs. As described in FIG. 3, the prompt may include the task request of the user and additional context information provided by the user. The machine learning module provides 604 the first prompt to the one or more machine-learned language models for execution. The machine learning module receives 606, from the one or more machine-learned language models, a set of generated responses to the first prompt. The machine learning module generates 608 a user interface on the client device displaying the first prompt and the set of generated responses comprising as a table user interface element. The machine learning module applies 610 a selected evaluation function to the set of generated responses to evaluate the responses with respect to an evaluation objective. The machine learning module identifies 612 one or more words that influence the evaluation. The machine learning module generates 614 one or more user interface elements on the user interface to display results of the evaluation for the set of generated responses and which highlights portions of the generated responses corresponding to the identified words.

Turning now to FIG. 7, illustrated is an example machine to read and execute computer readable instructions, in accordance with an embodiment. Specifically, FIG. 7 shows a diagrammatic representation of the data processing service 102 (and/or data processing system) in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 700. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include instructions for implementing the functionalities of the transaction module 330 and/or the file management module 335. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726, such as the network 120, via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store the instructions 724. The term "machine-readable medium" shall also be taken to include any medium that is capable of storing instructions 724 for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The disclosed configurations beneficially provide a method (and/or a system) for resolving concurrent transactions using deletion vectors. Without deletion vectors, concurrent transactions may fail to commit due to the conflicts introduced by intervening transactions, and the current transaction typically will have to start over from the most current version of the data table, resulting in wasted computing resources and time. By resolving concurrent conflicts in conjunction with deletion vectors associated with data files, the method presented herein may determine the serializability of the concurrent transactions and prevent many transaction operations from failing and having to be started over again, saving resources and cost for both the data processing service and the users of the data processing service.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined herein.

What is claimed is:

1. A method, comprising:

receiving, from a user of a client device, a plurality of first prompts for input to one or more machine-learned language models;

providing the plurality of first prompts to the one or more machine-learned language models for execution;

receiving, from the one or more machine-learned language models, a set of generated responses to the plurality of first prompts;

generating a user interface on the client device displaying the plurality of first prompts and the set of generated responses comprising as a table user interface element;

applying a selected evaluation function to the set of generated responses to evaluate the responses with respect to an evaluation objective, wherein applying the selected evaluation function further comprises:

extracting keywords from expected outputs to the plurality of first prompts and each response in the set of generated responses, applying a vector similarity technique to determine a number of matching keywords between keywords extracted from the expected output for each response and keywords identified in each response, and identifying hallucinated portions in the set of generated responses and generating one or more user interface elements on the user interface to display results of the evaluation for the set of generated responses and which highlights portions of the set of generated responses corresponding to the identified keywords, wherein the one or more user interface elements highlights the identified keywords in a generated response matching the extracted keywords from the expected output for the generated response, and presents one or more missing keywords from the expected output that are not found in the generated response, and wherein the one or more user interface elements for the generated response highlights an identified hallucinated portion in the generated response.

2. The method of claim 1, wherein applying the selected evaluation function to the set of generated responses further comprises:

generating a second prompt for input to an evaluation machine-learned language model, the second prompt specifying at least the generated response, and a request to apply the selected evaluation function to the set of generated responses;

providing the second prompt to the evaluation machine-learned language model for execution; and receiving, from the evaluation machine-learned language model, the one or more keywords from the set of generated responses identified by the selected evaluation function.

3. The method of claim 1, wherein the table user interface element displays the plurality of first prompts and the set of generated responses, wherein the plurality of first prompts is presented column-wise, and the generated responses from each of the one or more machine-learned language models to each first prompt are displayed row-wise.

4. The method of claim 1, wherein the table user interface element comprises a feedback mechanism which allows a user to indicate an evaluation of the generated response.

5. The method of claim 2, wherein the evaluation machine-learned language model determines a position of each of the identified keywords in the generated response.

6. The method of claim 1, obtaining a similarity score for each of the generated responses based on the number of matching keywords from each generated response.

7. A non-transitory computer-readable medium storing instructions that, when executed by a processor, cause the processor to:

receive, from a user of a client device, a plurality of first prompts for input to one or more machine-learned language models;

provide the plurality of first prompts to the one or more machine-learned language models for execution;

receive, from the one or more machine-learned language models, a set of generated responses to the plurality of first prompts;

generate a user interface on the client device displaying the plurality of first prompts and the set of generated responses comprising as a table user interface element;

apply a selected evaluation function to the set of generated responses to evaluate the responses with respect to an evaluation objective, wherein the instructions further cause the processor to:

extract keywords from expected outputs to the plurality of first prompts and each response in the set of generated responses, applying a vector similarity technique to determine a number of matching keywords between keywords extracted from the expected output for each response and keywords identified in each response, and identifying hallucinated portions in the set of generated responses and generate one or more user interface elements on the user interface to display results of the evaluation for the set of generated responses and which highlights portions of the set of generated responses corresponding to the identified keywords, wherein the one or more user interface elements highlights the identified keywords in a generated response matching the extracted keywords from the expected output for the generated response, and presents one or more missing keywords from the expected output that are not found in the generated response, and wherein the one or more user interface elements for the generated response highlights an identified hallucinated portion in the generated response.

8. The non-transitory computer-readable medium of claim 7, the instructions to apply the selected evaluation function to the set of generated responses further comprises instructions to:

generate a second prompt for input to an evaluation machine-learned language model, the second prompt specifying at least the generated response, and a request to apply the selected evaluation function to the set of generated responses;

provide the second prompt to the evaluation machine-learned language model for execution; and receive, from the evaluation machine-learned language model, the one or more keywords from the set of generated responses identified by the selected evaluation function.

9. The non-transitory computer-readable medium of claim 7, wherein the table user interface element displays the plurality of first prompts and the set of generated responses, wherein the plurality of first prompts is presented column-wise, and the generated responses from each of the one or more machine-learned language models to each first prompt are displayed row-wise.

10. The non-transitory computer-readable medium of claim 7, wherein the table user interface element comprises a feedback mechanism which allows a user to indicate an evaluation of the generated response.

11. The non-transitory computer-readable medium of claim 7, wherein the evaluation machine-learned language model determines a position of each of the identified keywords in the generated response.

12. The non-transitory computer-readable medium of claim 7, the instructions further causing the processor to obtain a similarity score for each of the generated responses based on the number of matching keywords.

13. A computer system, comprising:

one or more computer processors, and one or more memories comprising stored instructions that when executed by the one or more computer processors causes the computer system to:

receive, from a user of a client device, a plurality of first prompts for input to one or more machine-learned language models;

provide the plurality of first prompts to the one or more machine-learned language models for execution;

receive, from the one or more machine-learned language models, a set of generated responses to the plurality of first prompts;

generate a user interface on the client device displaying the plurality of first prompts and the set of generated responses comprising as a table user interface element;

apply a selected evaluation function to the set of generated responses to evaluate the responses with respect to an evaluation objective, wherein the instructions further cause the computer system to:

extract keywords from expected outputs to the plurality of first prompts and each response in the set of generated responses, applying a vector similarity technique to determine a number of matching keywords between keywords extracted from the expected output for each response and keywords identified in each response, and identifying hallucinated portions in the set of generated responses and generate one or more user interface elements on the user interface to display results of the evaluation for the set of generated responses and which highlights portions of the set of generated responses corresponding to the identified keywords, wherein the one or more user interface elements highlights the identified keywords in a generated response matching the extracted keywords from the expected output for the generated response, and presents one or more missing keywords from the expected output that are not found in the generated response, and wherein the one or more user interface elements for the generated response highlights an identified hallucinated portion in the generated response.

14. The computer system of claim 13, the instructions to apply the selected evaluation function to the set of generated responses further comprises instructions to:

generate a second prompt for input to an evaluation machine-learned language model, the second prompt specifying at least the generated response, and a request to apply the selected evaluation function to the set of generated responses;

provide the second prompt to the evaluation machine-learned language model for execution; and receive, from the evaluation machine-learned language model, the one or more keywords from the set of generated responses identified by the selected evaluation function.

15. The computer system of claim 13, wherein the table user interface element displays the plurality of first prompts and the set of generated responses, wherein the plurality of first prompts is presented column-wise, and the generated responses from each of the one or more machine-learned language models to each first prompt are displayed row-wise.

16. The computer system of claim 13, wherein the table user interface element comprises a feedback mechanism which allows a user to indicate an evaluation of the generated response.

17. The computer system of claim 13, wherein the evaluation machine-learned language model determines a position of each of the identified keywords in the generated response.

* * * * *